121,044

UNITED STATES PATENT OFFICE.

JULIUS EDMUND DOTCH, OF WASHINGTON, DISTRICT OF COLUMBIA.

IMPROVEMENT IN COMPOSITIONS FOR SOAPS.

Specification forming part of Letters Patent No. 121,044, dated November 21, 1871; antedated November 4, 1871.

To all whom it may concern:

Be it known that I, JULIUS EDMUND DOTCH, of the city of Washington, District of Columbia, have invented an Improved Composition for Soap and Saponaceous Compounds; and I do hereby declare that the following is a full and exact description thereof.

The invention consists in adding to the ordinary and general ingredients of soaps saponaceous compounds, ointments, washes, &c., a new disinfecting and deodorizing substance, thymol or thymic acid, or any of its derivatives, or thymate salts or any of the stearopters or their salts of any of the ethereal or essential aromatic oils.

Thymol $C^{10}H^{14}O^2$ is soluble in water, alcohol, glycerine, ether, acetic, tannic, boric, or other acids, or in aqueous potash and soda, and forms compounds which are soluble in water and in alcohol. It has no unpleasant taste or odor, but is very aromatic. Its solutions are strongly antiseptic. The proportions of the thymol in the different saponaceous preparations will naturally vary according to the uses they are destined for.

What I claim as my invention, and desire to secure by Letters Patent, is—

A disinfectant, deodorizing, and antiseptic soap or saponaceous compound wash or ointment made of the ingredients as above set forth.

JULIUS EDMUND DOTCH.

Witnesses:
P. H. FLOOD,
ROBT. E. BREWSTER.

(26)